June 30, 1936.  W. E. SLOAN  2,046,004
FLUSH VALVE
Filed Oct. 18, 1928
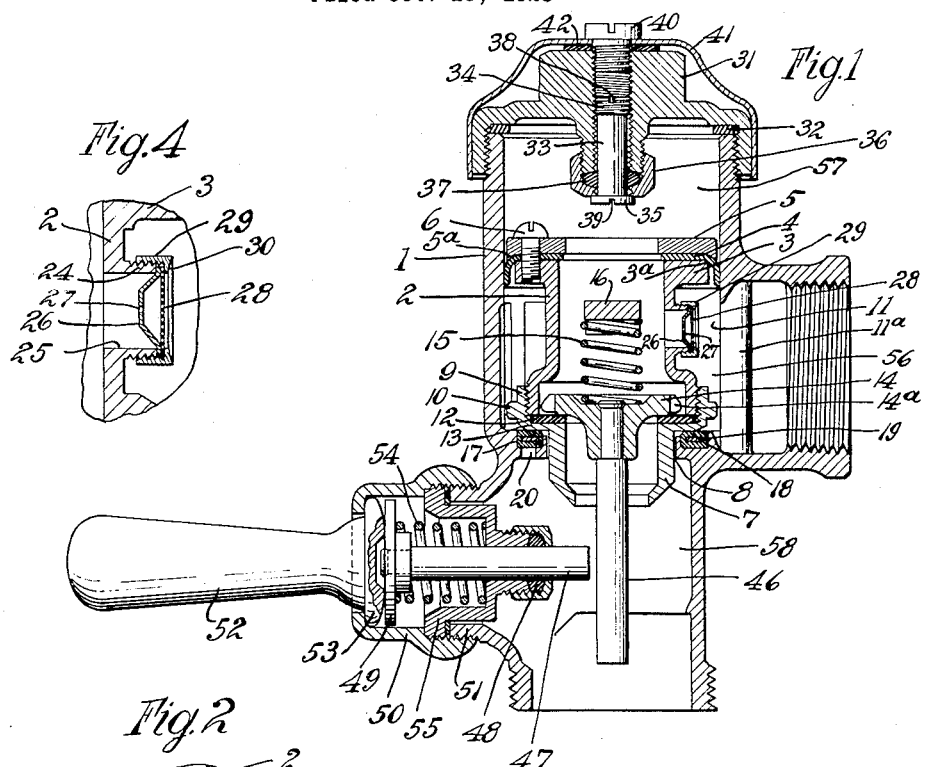
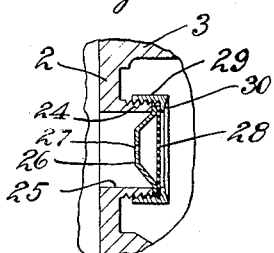
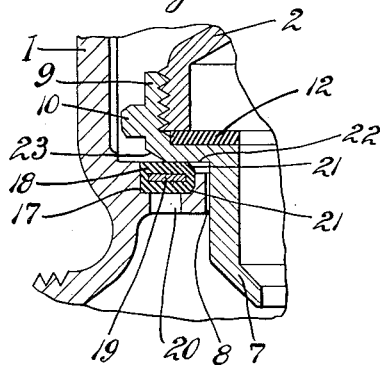
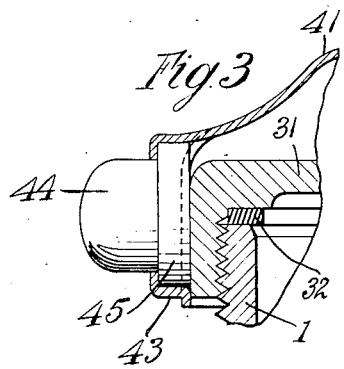
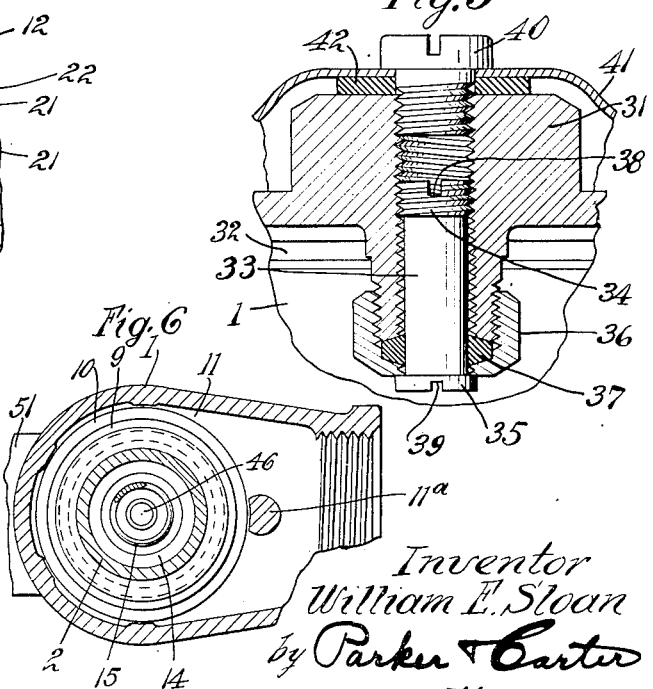
Inventor
William E. Sloan
by Parker & Carter
Attorneys.

Patented June 30, 1936

2,046,004

UNITED STATES PATENT OFFICE 2,046,004

FLUSH VALVE

William E. Sloan, Chicago, Ill.

Application October 18, 1928, Serial No. 313,230

9 Claims. (Cl. 137—93)

This invention relates to flush valves and has for its object to provide a new and improved device of this description.

The invention has as a further object to provide a valve which shall be inexpensive, quiet and efficient in operation with a free waterway in which the moving parts can be used as a unit.

The invention has as a further object to provide a valve which may be easily adjusted and which is easily accessible for inspection, cleaning and repairing.

The invention has as a further object to provide a valve which operates properly and successfully where the water is under various pressures from high pressure to a very low pressure.

The invention has as a further object to provide a valve which closes tightly even when hard particles lodge upon either of the contacting surfaces where the closure is made, thus permitting a tight contact and avoiding leakage.

The invention has other objects which are more particularly pointed out in the accompanying description.

Referring now to the drawing, Fig. 1 is a vertical, sectional view through one form of device embodying the invention.

Fig. 2 is an enlarged, sectional view through the valve seat and associated parts.

Fig. 3 is a sectional view showing the method of attachment of the bumper.

Fig. 4 is an enlarged view showing the construction of the by-pass.

Fig. 5 is an enlarged sectional view showing the adjustable stop device for the main valve.

Fig. 6 is a sectional view taken on line 6—6 of Fig. 1.

Like numerals refer to like parts throughout the several figures.

A casing 1 contains a main valve member shown of piston form having a central reduced portion 2 and enlarged ends which make contact with the casing. Connected with the enlarged end 3 of the valve member is a cup shaped packing member 4 held in position by the end piece 5 and the fastening devices 6. The lower face of the end piece 5 is curved near its outer edge as shown at 5a and the enlarged end 3 of the valve member is also curved as indicated at 3a and the packing member 4 is held between these curved faces. The end piece 3 projects downwardly along the downwardly turned edge of the packing as shown in Fig. 1 and keeps the packing from curling in when dry. Connected with the lower end of the valve member is a guide 7 which projects through the opening 8 through which water is discharged, and which acts as a guide for the valve when it is moved to its seat. This guide is of such a diameter as to provide a refill passage for the refill water as the valve is being moved to its seat and has an enlarged upper end 9 which receives the threaded end of the portion 2 and which has the lateral extension 10 which engages the separate vertical guiding surfaces 11.

A guide 11a is located in the admission opening and against which the valve member is pressed when the operating handle for the auxiliary valve is operated said guide preventing the valve from moving out due to the pressure caused by operating this handle. This guide makes it possible to provide a larger admission opening for the water and still properly guide the valve member. The valve member is preferably somewhat smaller than the space between the guides so that it engages only part of the guides at one time. It will be seen that this construction provides means for counteracting most advantageously the thrust of the handle plunger for operating the auxiliary valve hereinafter described. A yielding seat 12 rests on the wall 13 of the guide 7 and is clamped in position by the end of the central portion 2 of the valve member. This seat acts as the seat for the auxiliary valve 14 located in the valve member. The auxiliary valve is shown as a tilting valve and a spring 15 is interposed between the auxiliary valve and the cross piece 16 extending across the main valve member and assists in restoring the valve to its seat and normally maintaining it against its seat. The auxiliary valve is preferably provided with guiding projections 14a which engage the inner face of the main valve member so as to properly guide the auxiliary valve in its movement.

The valve casing is provided with a groove 17 in which is received a seating member 18 preferably of soft material such as rubber of some suitable form. This seating member is formed with a reinforcing member 19 therein. (See Fig. 2). At the bottom of the groove 17 there is provided an opening 20 which permits the escape of air when the seating member is placed in the groove and into which a pin or tool may be inserted to remove the seating member. This seating member has its inner edges removed either by a small chamfer or radius as shown at 21. This seating member is removable and reversible. The contact surface 22 of the guide upon the seating member is preferably about one-half the width of such seating member and the edge of the guide is beveled as shown at 23 so as to improve the shape of the channel for the flow of the water inwardly. It will be noted that the casing is provided with an inwardly projecting annular ledge which receives the groove 17 and the seating member 18. The seating portion of the main valve member projects over this ledge as shown.

The contact surface 22 and its opposed surface on the seating member are preferably inclined or conical. The main valve member is provided with a by-pass located on the central portion 2. This central portion is provided with a boss 24 having an opening 25 therethrough.

Located within the opening 25 is a by-piece 26 which is shown as being cup shaped and which has near its center a by-pass opening 27. A screen 28 of a mesh smaller than the diameter of the by-pass opening prevents the by-pass opening from being clogged. The by-pass piece and the screen are held in position on the boss by a threaded ring 29 which engages screen threads on the boss (see Fig. 4). This holding ring is inclined with an inclined or dish shaped surface 30 to facilitate cleaning of the screen.

The casing is provided with a main cover 31 which is removable and which is preferably screw threaded to the casing. A packing 32 is inserted between the cover and the casing, the main cover being provided with a hole extending therethrough. An adjusting screw 33 is located in the lower part of this hole, the upper end 34 of which is threaded and engages threads on the cover. The adjusting screw has a thin, enlarged lower end 35. The main cover is provided with a packing nut 36 into which is received the packing 37 through which the adjusting screw passes. The enlarged end 35 of the adjusting screw prevents it from being screwed up through the packing, and the threaded end 34 prevents it from being moved down through the packing.

The adjusting screw is provided at its upper end with the slots 38 so that it may be adjusted from the outside. The lower end is also provided with the slot 39. The adjusting screw is shorter in length than the hole in the casing and in the upper end of this hole, there is located a cap screw which when removed gives access to the adjusting screw. The outer cover 41 is provided preferably of sheet metal which is held in place by the cap screw 40. A packing piece 42 is located around the cap screw so as to make a tight joint. The outer cover extends down over the inside cover and is arranged for holding one or more bumpers.

For this purpose the outer cover is provided with a hole having a rim 43 (see Fig. 3). A bumper piece 44 extends through this hole and is provided with an enlarged shank 45 which engages the inner cover and which holds the bumper piece against accidental removal. This bumper piece is a yielding bumper piece and may be made of rubber or other suitable material. A plurality of these bumper pieces may be used if desired. The auxiliary valve 14 is provided with a projection 46. A plunger 47 is adapted to be moved to engage this projection and move the valve to its open position. This plunger works through a suitable packing 48 and is provided with an enlarged end which works in a cylindrical portion 50 which is attached by screw threads to a boss 51 on the casing. An operating handle 52 extends into the cylindrical portion 50 and is provided with an enlarged end 53 which engages the enlarged end 49 on the plunger 47.

A spring 54 is interposed between the enlarged end 49 and the end of the cylindrical portion 55 through which the inner end of the plunger passes. This spring normally returns the parts to their initial position. When the handle 52 is moved in any direction, the plunger 47 is moved inwardly so as to engage the part 46 and operate the auxiliary valve.

In the use of the device the water enters the chamber 56 which has the pressure of the water system. Water passes through the by-pass opening 27 into the chamber 57 and when the valve is not in operation, this chamber has the same pressure as chamber 56. The water passes from both chambers 56 and 57 into chamber 58 and thence out through the discharge pipe.

The use and operation of my invention are as follows. When the valve is connected up with the water system, the water enters the chamber 56 and passes through by-pass 27 into chamber 57 keeping the main valve member closed. To operate the valve, the handle 52 is moved. This moves the plunger 47 to engage the part 46 and move the valve 14 to open it. This lets the water in chamber 57 escape thus lowering the pressure of the water in this chamber. The pressure of the water in chamber 56 acts upon the main valve member and lifts it so as to open the valve, the water passing from chamber 56 through the opening 8 into the chamber 58 and thence through the discharge pipe. The upward movement of the main valve member is stopped by an enlarged end 35 of the adjusting screw 33, said enlarged end engaging the part 16.

It will be seen that the movement of the valve may be adjusted by adjusting this screw. If the screw is adjusted to project farther into the chamber 57, the movement of the main valve member will be reduced and if this screw is moved to project a smaller amount into the chamber 57, the movement of the main valve member will be increased. The amount of water discharged by the valve may thus be accurately adjusted through a large range.

It will be noted that the adjusting screw may be adjusted when the valve is in operation and under pressure, by simply removing the cap screw 40 and adjusting the screw 33 by means of a small screw driver. When the valve reaches the limit of its upward movement and the handle is released, the plunger 47 is withdrawn by the spring 54 and the spring 15 and gravity closes the auxiliary valve 14. The water passing from the chamber 56 through the by-pass 27 builds up the pressure in the chamber 57 thereby causing the main valve member to move down upon its seat and shut off the flow of water.

As the main valve member moves down, the guide 7 moves down into the opening 8 and the refill water passes through the space between the guide and the wall of the opening 8 so as to provide the proper amount of refill water. When the valve is closed, the face 22 of the guide 7 engages the face of the seating element 18.

It will be noted that this seating element is, as it were, a part of the casing and not a part of the valve member and remains stationary during the movement of the valve member. The valve member seating thereon shuts off the flow of the water. If foreign matter such as hard particles lodge either upon the seating face of the main valve element or upon the seating member, such particles will be passed into the soft seating member thus permitting a tight contact between the valve member and the seating member thereby preventing leakage. When the valve is again operated, these particles will be expelled by the soft seating member and washed away by the water flowing through the valve. No permanent depressions will be left in the seating member. It will further be noted that there is a relatively broad metal surface on the main valve member which rests upon a relatively broad soft rubber surface on the seating member. The cutting of the valve seat on account of wire drawing is thereby reduced to a minimum due to this construction. If for any reason the rubber seating surface becomes imperfect, the seating member can be easily reversed or easily and cheaply replaced. It will further be noted that the by-pass is arranged in such a manner that it will not be clogged by material which may be in the water. The by-pass member or cup may be easily removed for changing the size of the by-pass opening or for any other purpose.

One of the difficulties heretofore encountered in the use of packing for the valve is the difficulty of keeping the packing in position as the water which flows through the valve tends to loosen and remove the packing. This makes it necessary to fasten the packing by some effective fastening device. In the present case, no fastening device for the packing is required as the water has no tendency to remove it but on the other hand, the flow of the water through the valve acts to hold and keep the packing or seating member 18 in position and this is true even though the yielding seating member 18 be loosely fitted in the groove 17. It will further be seen that the seating element or member 18 is on a stationary part of the valve and is not moved when the valve is opened and closed. This construction, therefore, does away with the uncertainty of holding the packing member in place heretofore present in devices of this kind.

I claim:—

1. A flush valve comprising a casing, an inwardly projecting ledge connected with said casing, a main piston valve member in said casing having a hollow central portion, a guiding device with which said hollow central portion is removably connected, a portion of said guiding device overlapping said ledge, a guiding part thereon provided with a part which engages the inside of the casing, and a part which engages the inner face of said ledge, a portion of said guiding device extending through said ledge, an auxiliary valve located in said hollow central portion, a cross piece in said hollow central portion intermediate its ends, and a spring interposed between said cross piece and said auxiliary valve.

2. A flush valve comprising a casing, an inwardly projecting ledge connected with said casing, a main piston valve member in said casing having a hollow central portion, a guiding device with which said hollow central portion is removably connected, a portion of said guiding device overlapping said ledge, a guiding part thereon provided with a part which engages the inside of the casing, and a part which engages the inner face of said ledge, a portion of said guiding device extending through said ledge, an auxiliary valve located in said hollow central portion, a cross piece in said hollow central portion intermediate its ends, a spring interposed between said cross piece and said auxiliary valve, a cover for said casing and an adjustable stop which projects into the hollow of said central portion and engages said cross piece when the main valve member is opened to limit its opening movement.

3. A flush valve comprising a casing, an inwardly extending ledge connected with said casing, a main valve member comprising a hollow central portion, a guiding device removably connected with said hollow central portion and having a part which engages the inside of the casing and a part which projects over said ledge and acts as a seating surface, a non-metallic seating member embedded in a groove in said ledge and having its upper face substantially flush with the upper face of said ledge and which engages the seating face of said guiding part when the main valve member is closed.

4. A flush valve comprising a casing, an inwardly extending ledge connected with said casing, a groove in the upper face of said ledge, a non-metallic seating member tightly fitting in said groove, and an opening extending from the bottom of the ledge through the remaining portion thereof for the insertion of a tool for forcing the seating member from said groove.

5. A flush valve comprising a casing, a hollow main valve member in said casing and open at the top, a removable cover for said casing, an inwardly extending projection on said cover which projects into the hollow of said main valve member when the main valve member is in its open position, said projection being hollow, screw threads in said hollow, an adjustable stop in said hollow of said projection, threads on the outside of said projection, a threaded nut surrounding the end of said projection and of said adjustable stop, and an engaging part in the hollow of said main valve member which engages said stop to limit the opening movement of said valve.

6. A flush valve comprising a casing, a main valve member in said casing, a cover for said casing having an opening extending therethrough, a continuous thread extending through said opening, an adjustable threaded stop in the lower part of said opening which engages the main valve member and limits its opening movement, a packing member for said adjustable stop, and a separate screw in the upper part of the opening in said cover.

7. A flush valve comprising a casing, an inwardly extending ledge connected with said casing, a groove in the upper face of said ledge, a non-metallic seating member tightly fitting in said groove, and an opening extending from the bottom of the ledge through the remaining portion thereof for the insertion of a tool for forcing the seating member from said groove, the inner non-seating edges of the seating member being cut away.

8. A flush valve comprising a casing, a main valve member therein, said casing being provided with an inlet, said main valve member being hollow and being open at the top, a cover for said casing having an inwardly projecting part, said inwardly projecting part being hollow, screw threads in said hollow, an adjustable member having its end projecting from said inwardly projecting part, screw threads on the exterior of said inwardly projecting part, a threaded nut surrounding the end of said inwardly projecting part and said adjustable member, said inwardly projecting part and adjustable member entering the upper open end of the main valve member when the valve is opened, and an engaging part on the interior of the main valve member which engages the adjustable member.

9. A flush valve comprising a casing provided with an admission opening and a discharge opening, a valve member in said casing which moves back and forth across said admission opening and which engages the inner face of said casing, and a guide for said valve member located in the admission opening, the water entering the admission opening passing on opposite sides of said guide as it enters the casing.

WILLIAM E. SLOAN.